US012657735B2

(12) United States Patent
Zhang et al.

(10) Patent No.: US 12,657,735 B2
(45) Date of Patent: Jun. 16, 2026

(54) OBJECT TRACKING AND CLUSTER VOTING FOR TAG DETECTIONS AND EXCEPTIONS

(71) Applicant: Walmart Apollo, LLC, Bentonville, AR (US)

(72) Inventors: Han Zhang, Allen, TX (US); Avinash Madhusudanrao Jade, Bangalore (IN); Lingfeng Zhang, Flower Mound, TX (US); Zhaoliang Duan, Frisco, TX (US); Mingquan Yuan, Flower Mound, TX (US); Eric W. Rader, Plano, TX (US); Zhiwei Huang, Flower Mound, TX (US); Benjamin Ellison, San Francisco, CA (US); William Craig Robinson, Centerton, AR (US); Siddhartha Chakraborty, Kudghat (IN); Raghava Balusu, Achanta (IN); Aadarsh Gupta, Muvattupuzha (IN); Jing Wang, Dallas, TX (US); Rongdong Chai, Allen, TX (US); Ashlin Ghosh, Muvattupuzha (IN); Oleksandr Viatchaninov, Indian Trail, NC (US)

(73) Assignee: Walmart Apollo, LLC, Bentonville, AR (US)

( * ) Notice: Subject to any disclaimer, the term of this patent is extended or adjusted under 35 U.S.C. 154(b) by 400 days.

(21) Appl. No.: 18/403,452

(22) Filed: Jan. 3, 2024

(65) Prior Publication Data

US 2025/0218000 A1     Jul. 3, 2025

(51) Int. Cl.
*G06V 30/10* (2022.01)
*G06T 7/20* (2017.01)
(Continued)

(52) U.S. Cl.
CPC ............... *G06T 7/20* (2013.01); *G06V 20/50* (2022.01); *G06V 20/62* (2022.01);
(Continued)

(58) Field of Classification Search
CPC . G06T 7/20; G06T 2207/10016; G06V 20/50; G06V 20/62; G06V 30/19107; G06V 30/30; G06V 30/10
See application file for complete search history.

(56) References Cited

U.S. PATENT DOCUMENTS

| | | | |
|---|---|---|---|
| 12,205,353 B2 * | 1/2025 | Brown | G06V 10/82 |
| 2021/0374659 A1 * | 12/2021 | Ganapathi | B65G 1/1371 |

(Continued)

FOREIGN PATENT DOCUMENTS

CN     114419638 A     4/2022

OTHER PUBLICATIONS

Johnston, Meegan "How Wrap-Around Warehouse Pallet Labels Improve Inventory Tracking", ID Label https://idlabelinc.com/how-wrap-around-warehouse-pallet-labels-improve-inventory-tracking/ Retrieved Oct. 22, 2023, 8 pages.

*Primary Examiner* — Stephen R Koziol
*Assistant Examiner* — Dylan J Sherrillo
(74) *Attorney, Agent, or Firm* — Foley IP Law, PLLC

(57) ABSTRACT

Examples enable pallet tag tracking and cluster voting for more accurate pallet tag management using images of a selected pallet. A tag manager tracks a pallet through multiple images of the pallet to ensure the same pallet appears in every image. If the pallet tag is absent from all the images, a tag missing confidence score is generated that indicates the degree of confidence that the tag is missing from the pallet and not merely out of view. The score is used to prioritize handling of pallet tag missing exceptions. If the pallet tag is present in the images, optical character recognition (OCR)

(Continued)

results for each tag image are aggregated into a tag cluster with a confidence score calculated for each result. A pallet tag identification (ID) number is predicted based on the result having the highest confidence score to ensure the pallet tag ID is complete and accurate.

20 Claims, 8 Drawing Sheets

(51) Int. Cl.
  *G06V 20/50*          (2022.01)
  *G06V 20/62*          (2022.01)
  *G06V 30/19*          (2022.01)
  *G06V 30/30*          (2022.01)
(52) U.S. Cl.
  CPC ........ *G06V 30/19107* (2022.01); *G06V 30/30* (2022.01); *G06T 2207/10016* (2013.01)

(56)                  References Cited

U.S. PATENT DOCUMENTS

| | | | |
|---|---|---|---|
| 2022/0058425 A1 | 2/2022 | Savvides et al. | |
| 2022/0157063 A1* | 5/2022 | Bronicki | G06Q 30/014 |
| 2023/0140119 A1* | 5/2023 | Jackson | G06V 20/52 |
| | | | 382/177 |

* cited by examiner

100

400

408

402  404

404

406

406

412

414

410

600

START

OBTAIN PALLET AND TAG
DETECTION RESULTS
602

TRACK A SELECTED PALLET WITHIN
IMAGE SEQUENCE
604

TAG
PRESENT?
606

YES

NO

CALCULATE CLUSTER
VOTING SCORE
608

ASSIGN CONFIDENCE
SCORE
614

SELECT HIGHEST
SCORE RESULT
610

TRIGGER EXCEPTION
616

OBTAIN TAG ID NUMBER
612

PRIORITZE EXCEPTIONS
BASED ON SCORES
618

END

700

800

START

OBTAIN PALLET TAG MISSING EXCEPTIONS
802

GENERATE CONFIDENCE SCORES
804

RANK EACH EXCEPTION BASED ON SCORES
806

ASSIGN HIGHEST RANKED EXCEPTION TO A USER
808

OUTPUT ASSIGNMENT TO USER VIA UI
810

END

OBJECT TRACKING AND CLUSTER VOTING FOR TAG DETECTIONS AND EXCEPTIONS

BACKGROUND

Retail facilities, such as distribution centers, warehouses, and big box stores, frequently handle dozens, hundreds or even thousands of pallets of goods on a daily basis. These pallets are managed using a unique pallet identification (ID) number assigned to each pallet for tracking the pallet contents and pallet locations. The pallet ID numbers are typically printed on a paper tag affixed to an exterior surface of each pallet. Manually checking each pallet ID number on each pallet would be inefficient, time-consuming, and expensive. Computer vision object detection and recognition can be used to automatically analyze images of pallets to identify pallets and pallet ID numbers printed on the pallet tags. However, computer vision object identification results are sometimes unreliable or unavailable in some situations in which image data is sub-optimal, such as occurs with gray scale images, sub-optimal camera angles, poor lighting conditions, damaged pallet tags, pallet tags wholly or partially outside the field of view of the camera, and/or pallets with missing pallet tags. Pallet tag text can be manually verified. Human users can also replace missing and damaged tags. However, performing manual verification and/or correction for every pallet tag where image data is sub-optimal can be a laborious, impractical, cost-prohibitive, and overly time-consuming process.

SUMMARY

Some examples provide a system for pallet tag tracking and cluster voting. The system includes a computer-readable medium storing instructions that are operative upon execution by a processor to obtain pallet and pallet tag detection results associated with a plurality of pallets within a plurality of images generated by an image capture device within a retail environment. The system tracks a selected pallet appearing within a set of images within the plurality of images, the set of images comprising a sequence of images including a portion of the selected pallet. The system analyzes the set of images to determine whether a pallet tag associated with the selected pallet is present within any image in the set of images. The system assigns a confidence score indicating a degree of confidence the pallet tag associated with the selected pallet is absent. A pallet tag missing exception is generated in response to the determination the pallet tag is absent. The handling of the pallet tag missing exception is prioritized based on the confidence score. The system calculates a cluster voting score for each pallet tag text recognition result in a set of text recognition results associated with a set of pallet tag detections for the selected pallet in response to the determination the pallet tag is present within the set of images. A pallet tag text recognition result having a highest score is used to identify an accurate tag identification (ID) number on the pallet tag.

Other examples provide a method for pallet tracking and cluster voting. Pallet and pallet tag detection results associated with a plurality of pallets within image data associated with a plurality of images generated by an image capture device within a retail facility are obtained. A selected pallet appearing within a set of images within the plurality of images is tracked. The set of images includes images including a portion of the selected pallet. A determination is made whether a pallet tag associated with the selected pallet is present within any image in the set of images using a set of coordinates associated with the pallet. In response to determining the pallet tag is absent from the set of images, a tag missing confidence score is generated indicating a degree of confidence the pallet tag is absent based on quality of image data associated with the set of images. A pallet tag missing exception associated with the selected pallet is triggered, the pallet tag missing exception including the tag missing confidence score.

Still other examples provide a computer storage devices having computer-executable instructions stored thereon, which, upon execution by a computer, cause the computer to perform operations comprising obtaining pallet and pallet tag detection results associated with a plurality of pallets within a plurality of images generated by an image capture device within a retail facility. A selected pallet is tracked within the plurality of images. The set of images includes a sequence of images including a portion of the selected pallet. The set of images is analyzed to determine whether a pallet tag associated with the selected pallet is present within any image in the set of images. In response to a determination a portion of the pallet tag is present in a sub-set of the images in the set of images, a cluster of images including the sub-set of images is generated. A set of pallet tag text recognition results are generated based on text recognized in the portion of the pallet tag present in the cluster of images. A cluster voting score for each pallet tag text recognition result in a set of text recognition results associated with a set of pallet tag detections for the selected pallet is calculated in response to the determination the pallet tag is present within the set of images. A pallet tag text recognition result having a highest score is used to identify an accurate tag identification (ID) number on the pallet tag.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate correspond-ing parts throughout the drawings.

DETAILED DESCRIPTION

Figure 1:
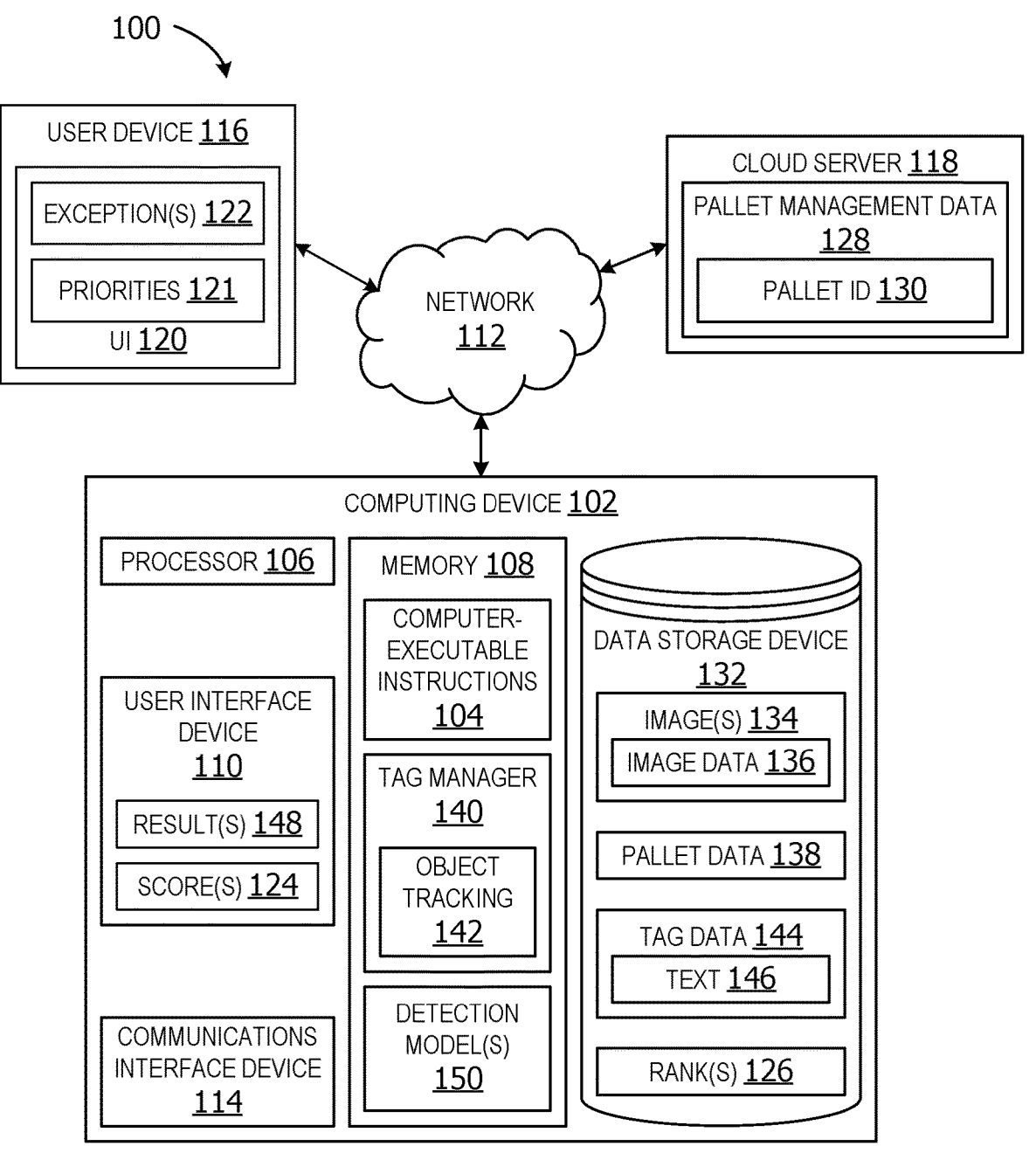
FIG. 1 is an exemplary block diagram illustrating a system for object tracking and cluster voting for pallet tag detections and pallet tag missing exceptions.

A more detailed understanding can be obtained from the following description, presented by way of example, in conjunction with the accompanying drawings. The entities, connections, arrangements, and the like that are depicted in, and in connection with the various figures, are presented by way of example and not by way of limitation. As such, any and all statements or other indications as to what a particular figure depicts, what a particular element or entity in a particular figure is or has, and any and all similar statements, that can in isolation and out of context be read as absolute and therefore limiting, can only properly be read as being constructively preceded by a clause such as "In at least some examples, . . . " For brevity and clarity of presentation, this implied leading clause is not repeated ad nauseum.

In the inventory management scenario, a series of images are taken in sequence when a robot moves along the aisles in the club. A pallet tag missing exception needs to be generated for each pallet without tags based on computer vision (CV) detection results of pallets and tags from aisle image series. However, pallets usually have only a partial view from a single image so that it is uncertain whether the tag is located on the invisible part of those pallets.

Pallet tags are typically attached to pallets to assist users in managing pallets. The pallet tags include information such as, but not limited to, a pallet identifier (ID), item ID, and/or a date the pallet tag was created. This information can be used to check a lookup table or database of pallet data to determine the contents of each pallet, track the locations of pallets within a retail environment, determine where to move pallets, and other pallet management decisions. How-ever, the pallet tags can become damaged, inadvertently removed from pallets, lost, or otherwise be missing from some pallets further complicating pallet management. In such cases, a pallet tag missing exception is generated. Pallet tag missing exceptions may be erroneously created where a pallet tag is present on the pallet but undetected by the object detection model because the tag is outside the current view of the camera capturing the image data of the pallet.

Moreover, if the camera captures multiple images of the same pallet, the system may erroneously create multiple pallet tag missing exceptions for the same pallet, resulting in duplication of effort expended by users in investigating and resolving tag missing exceptions, excessive consumption of memory and other data storage resources storing duplicated tag missing exceptions data, and/or wasted user time and other human resources consumed in verifying and correcting erroneous tag missing exceptions for pallets which are not in fact missing a pallet tag. This further reduces efficiency where time and effort spent correcting erroneous pallet tag missing exceptions results in less time and resources avail-able to replace actual missing pallet tags.

In situations where the pallet tag is visible in one or more images of the pallet, optical character recognition (OCR) is used to recognize and identify text printed on the pallet tag, such as the pallet ID and/or the item ID. If there are multiple images of the tag available, some images may have more complete and/or higher quality image data for the pallet tag than other images. In such cases, the system may use sub-optimal image data from a poor image of the pallet tag to obtain a partial or inaccurate pallet ID number for a pallet even though a higher quality image is available from which a more complete and more accurate pallet ID number could be obtained. This results in poor quality text recognition results that are unreliable and potentially result in false positives in pallet ID recognition results.

Referring to the figures, examples of the disclosure enable pallet tracking and cluster voting for managing pallets and pallet tags. In some examples, object tracking is provided to identify the same pallet in multiple different images captured by a robotic image capture device. The object tracking uses timestamp data, camera direction movement data and object features to identify the same pallet in each image in a sequence of images generated within a predetermined time period, such as while the robotic device is roaming up and down one or more aisles in a store. In this manner, all images containing the selected pallet, or a portion of the selected pallet can be aggregated together for analysis to determine if a pallet tag is present on the pallet shown in any of the images. The object tracking further prevents duplicate pallet tag missing exceptions from being generated where the pallet tag is not present in any of the images, as only a single exception is generated for each image cluster for a selected pallet. This reduces system resource usage by eliminating memory resources used to store duplicated pallet tag missing exceptions and reducing network bandwidth usage where fewer pallet tag missing exceptions are erroneously created and transmitted to a recipient, such as a user device or a data storage device.

Aspects of the disclosure further enable a tag manager that creates a tag cluster of images including the pallet and at least a portion of a pallet tag. The images in the tag cluster are analyzed and scored to identify the highest quality image having the best OCR results for the pallet tag text. This enables more efficient and accurate determination of the pallet tag ID while reducing erroneous text recognition results created based on poor quality image data.

The computing device operates in an unconventional manner by generating a tag cluster of images and generating cluster voting scores based on sets of images including a portion of the pallet to more accurately predict whether a pallet tag is present on a given pallet, identify the highest quality text recognition result for the pallet tag and/or prioritize exception handling where the pallet tag is not found on the pallet. In this manner, the computing device is used in an unconventional way, and allows less memory and data storage resource usage for storing pallet tag missing exceptions, reducing duplication of pallet tag missing excep-tions, and improves the quality of pallet tag text recognition where the pallet tags are detected in image data for more accurate and reliable pallet tag text recognition results. The system further generates a score for pallet tag missing exceptions such that the pallet tag missing exceptions are handled in accordance with a prioritization based on the scores. Exceptions with a higher confidence score are handled by human users before exceptions with lower scores, ensuring that resources are expended to resolve pallet tag missing exceptions which are most likely associated with pallets that are actually missing a pallet tag. This improves both system resource usage, reducing processor load, as well as improving human resource usage.

In other examples, the system generates pallet tag missing confidence scores indicating the likelihood the pallet tag is actually missing and not merely outside the field of view of the image capture device. The system further generates pallet tag text recognition results quality scores indicating the predicted quality of each text recognition result for each image in the tag image cluster. These scores are used to prioritize handling of pallet tag missing exceptions and used to select the highest quality text recognition results for utilization in pallet management. The scores can be presented to a user via a user interface (UI) for improved user efficiency via UI interaction and increased user interaction performance where user time spent manually verifying faulty text recognition data and/or resolving erroneous pallet tag missing exceptions is drastically reduced.

Other examples provide high accuracy missing tag detections with tag missing scores used to differentiate high confidence exceptions and low confidence exceptions. The system further provides a light weighted tracking logic to identify the same pallet from different images under different lighting condition and in gray scale images, as well. Cluster voting logic is provided to merge image data for different images of the same pallet tag further improving OCR accuracy and pallet ID number prediction.

Referring again to FIG. 1, an exemplary block diagram illustrates a system 100 for object tracking and cluster voting for pallet tag detections and pallet tag missing exceptions. In the example of FIG. 1, the computing device 102 represents any device executing computer-executable instructions 104 (e.g., as application programs, operating system functionality, or both) to implement the operations and functionality associated with the computing device 102. The computing device 102, in some examples includes a mobile computing device or any other portable device. A mobile computing device includes, for example but without limitation, a mobile telephone, laptop, tablet, computing pad, netbook, gaming device, and/or portable media player. The computing device 102 can also include less-portable devices such as servers, desktop personal computers, kiosks, or tabletop devices. Additionally, the computing device 102 can represent a group of processing units or other computing devices.

In some examples, the computing device 102 has at least one processor 106 and a memory 108. The computing device 102, in other examples includes a user interface device 110.

The processor 106 includes any quantity of processing units and is programmed to execute the computer-executable instructions 104. The computer-executable instructions 104 is performed by the processor 106, performed by multiple processors within the computing device 102 or performed by a processor external to the computing device 102. In some examples, the processor 106 is programmed to execute instructions such as those illustrated in the figures (e.g., FIG. 6, FIG. 7, and FIG. 8).

The computing device 102 further has one or more computer-readable media such as the memory 108. The memory 108 includes any quantity of media associated with or accessible by the computing device 102. The memory 108 in these examples is internal to the computing device 102 (as shown in FIG. 1). In other examples, the memory 108 is external to the computing device (not shown) or both (not shown). The memory 108 can include read-only memory and/or memory wired into an analog computing device.

The memory 108 stores data, such as one or more applications. The applications, when executed by the processor 106, operate to perform functionality on the computing device 102. The applications can communicate with counterpart applications or services such as web services accessible via a network 112. In an example, the applications represent downloaded client-side applications that correspond to server-side services executing in a cloud.

In other examples, the user interface device 110 includes a graphics card for displaying data to the user and receiving data from the user. The user interface device 110 can also include computer-executable instructions (e.g., a driver) for operating the graphics card. Further, the user interface device 110 can include a display (e.g., a touch screen display or natural user interface) and/or computer-executable instructions (e.g., a driver) for operating the display. The user interface device 110 can also include one or more of the following to provide data to the user or receive data from the user: speakers, a sound card, a camera, a microphone, a vibration motor, one or more accelerometers, a BLUETOOTH® brand communication module, wireless broadband communication (LTE) module, global positioning system (GPS) hardware, and a photoreceptive light sensor. In a non-limiting example, the user inputs commands or manipulates data by moving the computing device 102 in one or more ways.

The network 112 is implemented by one or more physical network components, such as, but without limitation, routers, switches, network interface cards (NICs), and other network devices. The network 112 is any type of network for enabling communications with remote computing devices, such as, but not limited to, a local area network (LAN), a subnet, a wide area network (WAN), a wireless (Wi-Fi) network, or any other type of network. In this example, the network 112 is a WAN, such as the Internet. However, in other examples, the network 112 is a local or private LAN.

In some examples, the system 100 optionally includes a communications interface device 114. The communications interface device 114 includes a network interface card and/or computer-executable instructions (e.g., a driver) for operating the network interface card. Communication between the computing device 102 and other devices, such as but not limited to a user device 116, a cloud server 118, and/or an image capture device, can occur using any protocol or mechanism over any wired or wireless connection. In some examples, the communications interface device 114 is operable with short range communication technologies such as by using near-field communication (NFC) tags.

The user device 116 represents any device executing computer-executable instructions. The user device 116 can be implemented as a mobile computing device, such as, but not limited to, a wearable computing device, a mobile telephone, laptop, tablet, computing pad, netbook, gaming device, and/or any other portable device. The user device 116 includes at least one processor and a memory. The user device 116 can also include a user interface (UI) 120. The UI 120 is a user interface device, such as, but not limited to, the user interface device 110. The UI 120 displays data to a user, such as one or more pallet tag missing exception(s) 122 and/or priorities 121 associated with the pallet tag missing exception(s) 122.

The priorities 121 are generated based on one or more pallet tag missing confidence scores, such as, but not limited to, the score(s) 124. The score(s) 124 includes any type of score. The score(s) 124 can include percentage scores, scores having values between zero and one, a score on a scale between one and ten, a letter or number grade, a binary score of high or low, as well as any other type of score.

The priorities 121 are optionally also based on one or more rank(s) 126. The rank(s) 126 indicates priority or likelihood a pallet tag missing exception is a correctly issued exception for a pallet that is actually missing a pallet tag. The rank(s) 126 can include any type of rank. A rank, in some examples, is an ordinal number rank, such as, but not limited to, a rank of first, second, third, etc. In other examples, the ranks can include letter ranks, number ranks, rank classifications, etc. A rank classification includes two or more classes, such as highest priority classification and a lowest priority classification, etc.

The higher the priority, score or rank for a given pallet tag missing exception, the higher the level of confidence that the pallet is actually missing the tag. The lower the priority, score, or rank, the higher the likelihood that the pallet tag missing exception is erroneous or otherwise associated with a pallet that may not be missing a pallet tag due to poor image quality used to make the pallet tag missing determination. The scores are generated based on factors, such as image quality, image lighting, trajectory of the robotic device, size of pallet, camera angles, position of pallet, etc.

The cloud server 118 is a logical server providing services to the computing device 102 or other clients, such as, but not limited to, the user device 120. The cloud server 118 is hosted and/or delivered via the network 112. In some non-limiting examples, the cloud server 118 is associated with one or more physical servers in one or more data centers. In other examples, the cloud server 118 is associated with a distributed network of servers.

In this example, the cloud server 118 includes a cloud storage storing pallet management data 128, such as, but not limited to, a pallet ID 130 for each pallet in a plurality of pallets associated with the pallet management data 128. The pallet management data 128 optionally also includes data associated with the contents of each pallet, location of each pallet, and other pallet management data.

The system 100 can optionally include a data storage device 132 for storing data, such as, but not limited to one or more image(s) 134 of a selected pallet, pallet data 138, tag data 144 and/or the rank(s) 126 associated with tag missing exception(s) 122. The image(s) 134 include image data 136 identifying the selected pallet via labels (annotations) and/or bounding boxes enclosing cropped images of the selected pallet.

The image(s) 134 are generated by an image capture device, such as, but not limited to, the image capture device(s) 204 shown in FIG. 2 below. The image capture device is a device for generating one or more digital image(s) 134. The digital image(s) 134 includes black-and-white (gray scale) images and/or color images. The digital image(s) 134, in some examples, include still images. In other examples, the digital image(s) 134 includes video, such as multiple images generated in sequence. The image(s) 134 optionally include metadata, such as, but not limited to, a timestamp, an image capture device identifier (ID) identifying the image capture device that generated the image(s) 134, and/or location data indicating a location of the image capture device when the image(s) 134 are created.

In these embodiments, the image(s) 134 are images of objects of interest. The images do not include users, human faces, or customers within the retail environment. Any images having human users, human faces, or other objects which are not of interest inadvertently included within the images are removed from the image(s) by cropping the images such that only objects of interest remain in the cropped images. Images of users or objects which are not of interest are deleted or otherwise discarded. The cropped images containing only the objects of interest are then analyzed to identify the objects of interest within the cropped images, such as, but not limited to, the items and/or the vertical members.

The image capture device generating the image(s) 134 is implemented as a camera or other image capture device mounted to a robotic device in this example. However, in other embodiments, the image capture device includes hand-held image capture devices, image capture devices mounted to a fixture, and/or image capture devices integrated within a computing device, such as a cellphone, tablet, smart glasses, or other mobile user device.

The pallet data 138 is data associated with a pallet, such as, but not limited to, a pallet ID number, item ID numbers for one or more items on the pallet, description of the contents of the pallet, universal product codes (UPCs) of items on the pallet, date the pallet was built, origin/source of the pallet, etc. The tag data 144 includes recognized text 146 interpreted by an OCR from the image data 136. The tag data for each detected tag associated with each pallet is stored and used to predict the pallet ID 130 for each pallet. The OCR result(s) 148 are optionally used to generate the tag data 144.

The data storage device 132 can include one or more different types of data storage devices, such as, for example, one or more rotating disks drives, one or more solid state drives (SSDs), and/or any other type of data storage device. The data storage device 132, in some non-limiting examples includes a redundant array of independent disks (RAID) array. In some non-limiting examples, the data storage device(s) provide a shared data store accessible by two or more hosts in a cluster. For example, the data storage device may include a hard disk, a redundant array of independent disks (RAID), a flash memory drive, a storage area network (SAN), or other data storage device. In other examples, the data storage device 132 includes a database.

The data storage device 132 in this example is included within the computing device 102, attached to the computing device, plugged into the computing device, or otherwise associated with the computing device 102. In other examples, the data storage device 132 includes a remote data storage accessed by the computing device via the network 112, such as a remote data storage device, a data storage in a remote data center, or a cloud storage.

The memory 108 in some examples stores one or more computer-executable components, such as the tag manager 140. The tag manager, when executed by the processor 106 of the computing device 102, obtains pallet and pallet tag detection results associated with a plurality of pallets within a plurality of images generated by an image capture device within a retail environment from one or more detection model(s) 150.

The detection model(s) 150 includes one or more trained, convolutional neural network (CNN) object detection models implemented on a computer vision (CV) item recognition as a service (IRAS) platform. The detection model(s) 150 includes a pallet detection and recognition model that detects and recognizes pallets and pallet tags within image data 136. The detection model(s) 150 provides the image data including indicators identifying one or more pallets within the images, including the selected pallet.

The object detection model(s) 150 are deep learning CV models trained using customized, hand-labeled training data to recognize the object of interest. In this example, an item detection model detects items, such as individual items, pallets, pallet tags and/or item tags. An item tag is a tag on an individual item and/or a tag on a pallet. The pallet tag includes information such as a pallet ID, an item ID, and/or a date the tag was created. The tag may include other information, such as barcodes, shipping information, etc. The item detection model encloses each item/pallet in a bounding box. Each item tag, including pallet tags, are also enclosed in a bounding box by the item detection model.

The object tracking 142 is a software component that tracks the selected pallet appearing within a set of one or more images from the plurality of images. Any images in the plurality of images which do not include at least a portion of the selected pallet are discarded or otherwise ignored. The set of images includes a sequence of images showing the selected pallet in whole or in part. The sequence of images includes two or more images of the selected pallet or portion of the pallet captured by the same image capture device within a predetermined period of time as the image capture device is moved along a route along an aisle, pallet reserve area, or other area including one or more pallets.

The predetermined period of time is a time span, such as a five minute time period, an hour, a day, etc. The predetermined period is a user-configurable amount of time. In this manner, the images include images of pallets captured within a relatively short period of time as the robotic device moves along an aisle or around an end-cap of an aisle. The aisle optionally includes pallet storage structures, such as bins, shelving, etc. The timestamps enable the system to identify images in accordance with an order in which the images were generated chronologically.

The object tracking 142 enables the tag manager 140 to track a target object, such as a selected pallet and/or a selected pallet tag within multiple different images. A target object, such as a pallet, can appear at different angles, in different lighting and in different areas within each image. For example, a target pallet may be fully visible in the center of a first image, be visible in its entirety at the far right edge of a second image and be only partially visible and partially out of frame in a third image. Likewise, in one example, a first side of the pallet may be visible in a first image, the first and part of a second side may be visible in a second image, the second and a third side may be visible in a fourth image. The object tracking 142 enables the system to consistently identify the same pallet in every image regardless of the position, visibility, or percentage of the pallet which is shown in each image.

The object tracking 142, in some embodiments, uses image timestamp data to identify the order in which images were captured by the image capture device. An image generated at a time 10:22:34 occurs earlier in a sequence than another image of the same pallet captured by the same image capture device 116 with a timestamp of 10:22:42. In this manner, the system determines the correct sequence in which images are generated. The sequence enables the tag manager 140 to track the same object more accurately in images taken as the image capture device moves in a given direction through the retail environment.

In other words, as the image capture devices moves in a given direction, the objects being captured in the images appear to move from a first edge of the images as the object first comes into frame, then centered as the image capture device continues moving, and finally the object appears near the second edge of the images before finally no longer being visible within the images as the targeted object is no longer in frame as the images are captured in sequence.

The tag manager 140 analyzes the set of images to determine whether a pallet tag associated with the selected pallet is present within any image in the set of images. The tag manager assigns a confidence score indicating a degree of confidence the pallet tag associated with the selected pallet is absent from the images. A pallet tag missing exception is generated in response to the determination the pallet tag is absent. Handling of the pallet tag missing exception is prioritized based on the confidence score for each pallet tag missing exception. The pallet tag missing exception is a report, ticket or other record identifying the selected pallet and indicating a failure to detect a pallet tag in the images.

The tag manager, in this example, calculates a cluster voting score for each pallet tag text recognition result in a set of text recognition result(s) 148 associated with a set of pallet tag detections for the selected pallet in response to the determination the pallet tag is present within the set of images. A pallet tag text recognition result having a highest score is used to identify an accurate tag identification (ID) number on the pallet tag.

The tag manager 140, in this example, is located on the computing device 102. However, the embodiments are not limited to implementing the tag manager on a computing device. In other examples, the tag manager 140 is hosted on a cloud server, such as, but not limited to, the cloud server 118 in FIG. 1 and/or the cloud server 118 shown in FIG. 2 below.

In this example, the detection model(s) 150 are separate components from the tag manager 140. However, in other embodiments, the tag manager includes the detection model(s) 150. In still other examples, the detection model(s) 150 are located on a separate computing device or located on the cloud server 118. In these examples, the image data associated with the plurality of images containing annotated objects of interest detected by the models, such as the pallets and pallet tags, are transmitted to the tag manager on the computing device 102 from the cloud server via the network 112.

Figure 2:
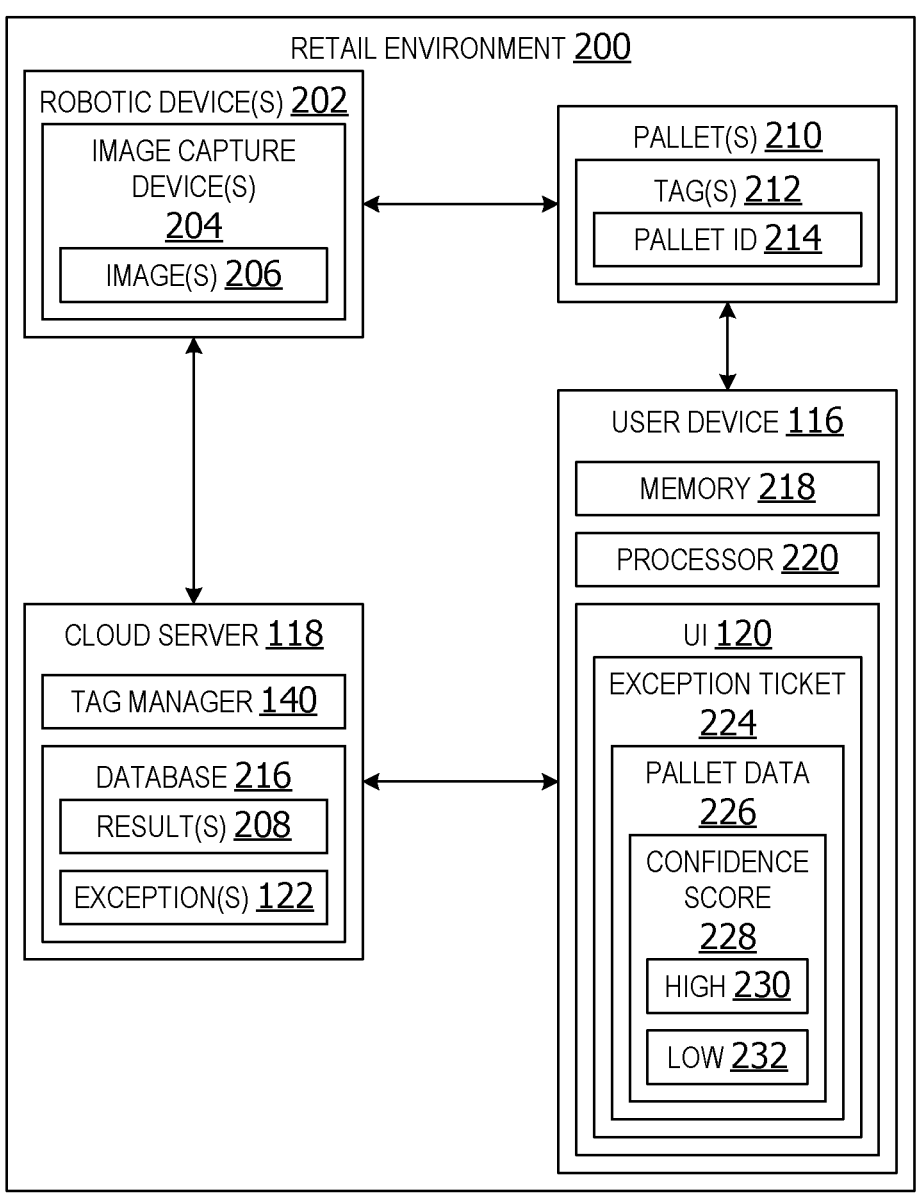
FIG. 2 is an exemplary block diagram illustrating a retail environment including a tag manager performing object tracking and cluster voting for managing pallet tag detections and missing pallet tags.

FIG. 2 is an exemplary block diagram illustrating a retail environment 200 including a tag manager 140 performing object tracking and cluster voting for managing pallet tag detections and missing pallet tags. The retail environment 200 includes one or more image capture device(s) 204 for capturing image(s) 206 of pallets used to track pallets and detect pallet tags using object detection result(s) 208. The image(s) 206 includes one or more images of pallets, such as, but not limited to, the image(s) 134 in FIG. 1.

The retail environment 200 is an environment including a retail facility, such as, but not limited to, a store, a warehouse, and/or a distribution center. A store is any type of facility having retail items for purchase or lease. The store includes indoor facilities, outdoor facilities and facilities which include both fully enclosed areas, unenclosed areas and/or partially encloses areas, such as garden centers.

The image capture device(s) 204 includes one or more image capture devices for generating the image(s) 206. The image capture device(s) 204, in this example, are mounted on one or more robotic devices or integrated into one or more robotic devices, such as, but not limited to, the robotic device(s) 202. The robotic device(s) 202 transmits the image(s) 206 to a cloud server 118 for analysis by the tag manager 140 via a network, such as, but not limited to, the network 112 in FIG. 1.

The object detection model(s) 150 analyzes the image(s) 206 to identify a plurality of pallet(s) 210 and/or one or more pallet tag(s) 212. The pallet tag(s) include pallet data, such as, but not limited to, a pallet ID 214 for each pallet. Each pallet is assigned a unique pallet ID number. The pallet ID number in this example is an alphanumeric sequence of letters and/or digits. Each pallet includes one or more items within the contents of the pallet. Each pallet optionally includes a pallet wooden base used to lift the pallet via a forklift. The pallet ID number is used to obtain information on contents of the pallet, such as names of items, brand, variety, packaging size, item counts per package, pricing information, number of instances of each item on the pallet, etc.

The result(s) of the object detection are stored in a data store, such as, but not limited to, a database 216. The database 216 in this example is a relational database for storing pallet-related data, such as the pallet detection result(s) 208, OCR text recognition results, scores, ranks, pallet tag missing exceptions, predicted pallet IDs, and/or any other data.

In some examples, the tag manager 140 transmits pallet data to a user device 116 for presentation to a user via a UI 120. The UI is a user interface device, such as, but not limited to, the user interface device 110 and/or the UI 120 in FIG. 1. The user device in this example also includes a processor 218 and a memory 220.

The UI 120 presents data to a user for viewing. The data displayed via the UI optionally includes an exception ticket 224 associated with a pallet tag missing exception. The exception ticket 224 optionally includes pallet data 226, such as the location of the pallet within the retail environment 200. The exception ticket includes the confidence score generated for the corresponding pallet tag missing exception. The confidence score 228 includes a high 230 score indicating a high confidence that a tag is missing from a pallet. The confidence score can also include a low 232 score indicating a low confidence that the pallet tag is missing.

Figure 3:
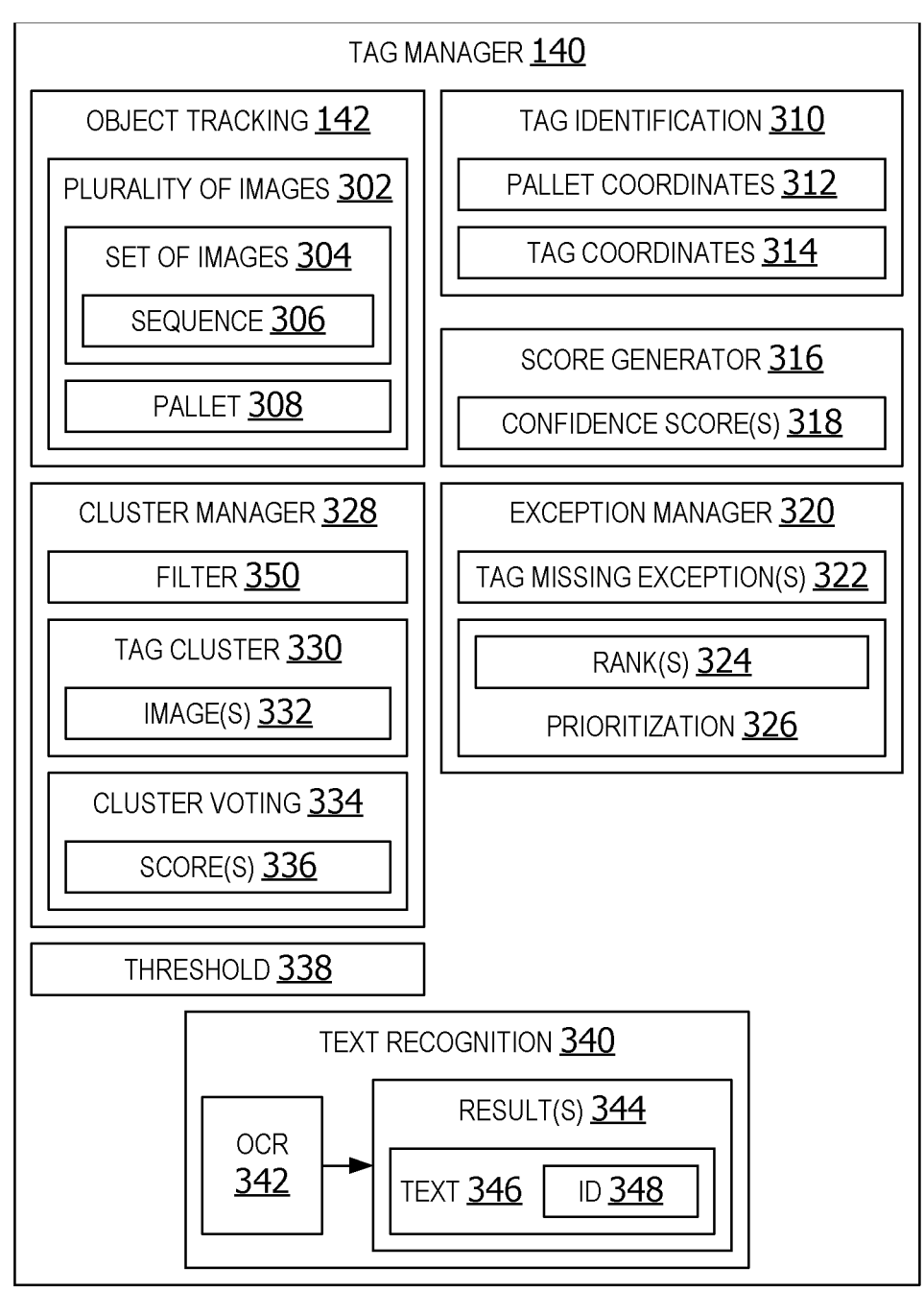
FIG. 3 is an exemplary block diagram illustrating a tag manager for performing cluster voting and pallet tracking using image data.

Turning now to FIG. 3, an exemplary block diagram illustrating a tag manager 140 for performing cluster voting and pallet tracking using image data is shown. The tag manager 140 obtains pallet and pallet tag detection results associated with a plurality of pallets within a plurality of images 302 generated by an image capture device, such as, but not limited to, the image capture device(s) 204 in FIG. 2. The plurality of images 302 includes two or more images of one or more pallets generated within a sequence 306 as a robotic device moves within a retail environment. The plurality of images 302 includes annotations identifying objects of interest, such as pallets and pallet tags. The annotations include bounding boxes and/or labels. The objects of interest are detected by one or more trained object detection models, such as, but not limited to, the object detection model(s) 150 in FIG. 1. The object tracking 142 identifies a selected pallet 308 in a set of one or more images 304. The object tracking 142 tracks the same pallet based on direction movement/trajectory of the robotic device associated with the image capture device (camera), size of pallet, and shape of the selected pallets, timestamps associated with the images, etc. The object tracking 142 tracks the selected pallet 308 appearing within the set of images 304.

A tag identification 310 is a software component that analyzes the set of images 304 and determines whether a pallet tag associated with the selected pallet is present within any image in the set of images 304. The pallet tag is a tag, such as, but not limited to, one or more of the tag(s) 212 in FIG. 2. In some embodiments, the tag identification 310 identifies a tag for the selected pallet by determining whether pallet coordinates 312 for the selected pallet 308 intersects or overlaps with a pallet tag in any of the images. In one example, if tag coordinates 314 for a bounding box surrounding a detected pallet tag overlaps with a set of pallet coordinates 312 for a bounding box enclosing the selected pallet 308 in the image data for at least one image, the tag identification 310 determines a pallet tag is present in at least one of the images in the set of images 304.

In some embodiments, a score generator 316 generates one or more confidence score(s) 318 associated with detection of a pallet tag and/or failure to detect a pallet tag. In this example, the if the tag identification 310 fails to detect a pallet tag associated with any image in the set of images 304 including a portion of the pallet 308, the score generator 316 generates a score indicating a level of confidence in the "tag missing" prediction. Thus, if the image quality is good and all sides of the pallet are visible in the set of images, the confidence score is high. If the image quality is poor and only some portions of the pallet are visible in the set of images, it is more likely the pallet tag may simply be on a side of the pallet which is not captured in the set of images. In this case, the confidence score is lower, indicating a lower degree of confidence that the tag is actually missing.

An exception manager 320, in some examples, triggers one or more pallet tag missing exception(s) 322 if the tag identification 310 fails to detect a tag associated with one or more pallets. Only one exception should be sent for each unique pallet, though the tag missing pallet can appear in multiple images.

Each tag missing exception is output with a confidence score indicating the degree of confidence that the tag is missing for the indicated pallet. The confidence score(s) 318 are used to generate rank(s) 324 of prioritization 326 for managing the pallet tag missing exception(s) 322. The higher the confidence score, the more likely the pallet tag does need to be replaced on the pallet. These pallets are given higher priority for correction than exceptions having lower confidence scores. The exception manager 320 further ensures only a single pallet tag missing exception is generated for each pallet where a tag is not found in the image data. This maximizes use efficiency expended in resolving pallet tag missing exceptions while ensuring pallets without tags have new tags placed on them without unnecessary delay. This improves efficiency as well as reduces the number of erroneous pallet tag missing exceptions.

Thus, the score generator 316 assigns a confidence score indicating a degree of confidence that the pallet tag associated with the selected pallet is absent. A pallet tag missing exception is generated by the exception manager 320 in response to the determination the pallet tag is absent. The handling of the pallet tag missing exception(s) 322 is prioritized based on the assigned tag missing confidence scores.

In some embodiments, a cluster manager 328 identifies one or more image(s) 332 in the set of images 304 including a portion of a pallet tag in the image. The image(s) and/or image data associated with these images including the pallet tag or a portion of the pallet tag are aggregated into a tag cluster 330. A text recognition 340 performs OCR 342 on the image data for the tag cluster 330 to obtain text recognition result(s) 344 identifying text 346 in each pallet tag image in the image(s) 32, including an ID 348. The ID 348 can include a pallet tag ID, an item ID, a pallet ID, or any other ID used to identify the pallet 308. The ID 348 generated by the text recognition 340 can include a partial ID that is missing one or more alphanumeric characters or a complete ID that is not missing any letters or numbers in the ID.

A cluster voting 334 is performed to generate one or more tag recognition result score(s) 336 indicating a level of confidence that the ID 348 for a given OCR result is a complete and accurate ID for the pallet 308 and not a misread ID or an incomplete ID. The scores are generated based on image quality, whether the number of alphanumeric characters recognized in the ID match an expected number of alphanumeric characters, the number of instances of text recognition results having the exact same ID, etc. These factors tend to indicate the ID is likely to be correct.

For example, if the ID should be a ten digit number and the result(s) include three text results having identical ten digit numbers, then it is likely this is the complete and correct ID for the selected pallet. In another example, if the text recognition results include three different ID numbers having less than the expected number of digits, then these results receive lower scores.

In some embodiments, a filter 350 is applied to filter out any text recognition results having a score that falls below a minimum threshold 338 score is discarded. This enables quick removal of results which are very unlikely to be correct. However, in other examples, results with lower scores are not filtered. Instead, these results are compared with each other. If results with low scores have consistent results including the exact same ID with the expected number of digits, then the low scores for the image(s) in the tag cluster having a low score are combined to increase the score, reflecting the fact that multiple results having the same ID are more likely to be correct.

In still other embodiments, the number of instances of results having the same ID number recognized are added together and then multiplied by the score for the instances having the same ID number. This increases the score for results which have the same score and the same detected ID number. This combined score is then compared with all score(s) 336 to select the best text recognition result. The selected text recognition result is used to predict the pallet ID for the selected pallet.

Thus, the cluster voting in this example calculates a cluster voting score for each pallet tag text recognition result in a set of text recognition results associated with a set of pallet tag detections for the selected pallet in response to the determination the pallet tag is present within the set of images. A pallet tag text recognition result having a highest score is used to identify an accurate tag identification (ID) number on the pallet tag.

Figure 4:
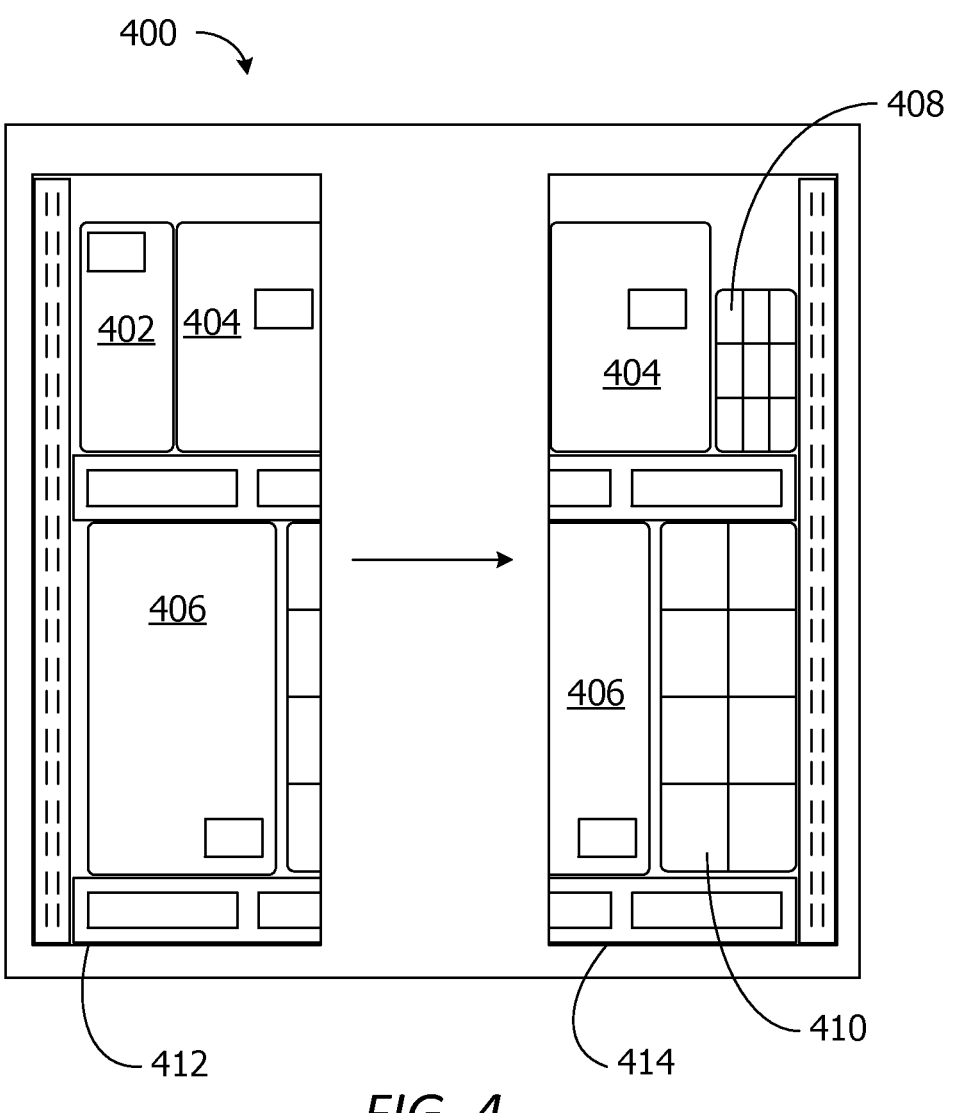
FIG. 4 is an exemplary block diagram illustrating image data including images of pallets used for pallet tracking.

FIG. 4 is an exemplary block diagram illustrating image data 400 including images of pallets used for pallet tracking. In this example, a first pallet 402, a second pallet 404 and a third pallet 406 are detected in a first image 412. In a second image 414, the first pallet 402 is no longer visible because the robotic device having the image capture device is traveling in a direction that is moving away from the first pallet. The second pallet 404 and the third pallet 406 are still visible in the second image 414. A new third pallet 408 and a fourth pallet 410 are now visible in the second image. The third and fourth pallets come into frame in the second image because the robotic device is moving in a direction that is bringing those pallets into the field of view of the image capture device camera lens.

The tag manager is able to track selected objects in images generated in a sequence within a given time frame, as illustrated in this example. In this example, objects are tracked in only two images. However, in other examples, objects can be tracked through three or more images as a robotic devices moves up and down various aisles, as well as around end-caps of aisles. In some examples, objects are tracked through ten or more images.

Figure 5:
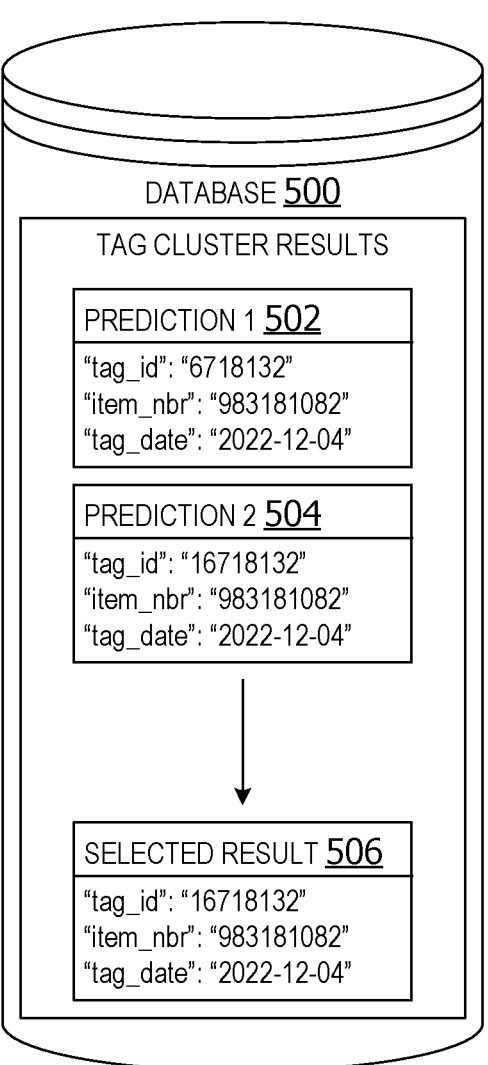
FIG. 5 is an exemplary block diagram illustrating a database for storing tag text recognition results associated with a tag cluster of images.

Turning now to FIG. 5, an exemplary block diagram illustrating a database 500 for storing tag text recognition results associated with a tag cluster of images is shown. The database 500 is a database for storing data, such as, but not limited to, the database 216. The database 500 can include a database on a data storage device, such as, but not limited to, the data storage device 132 in FIG. 1 and/or a database on a cloud storage, such as, but not limited to, a cloud storage associated with the cloud server 118.

In this example, the database 500 stores text recognition results associated with a tag cluster. The tag cluster results include a first prediction 502 for a tag ID having only seven digits and a second prediction 504 for a tag ID having eight digits. In this example, the second prediction 504 is the selected result 506 because the second prediction includes more digits, indicating this ID is more likely to be the complete ID.

In another example, the expected number of digits in the pallet ID is eight. Therefore, the second prediction receives a higher score for having the expected number of digits, such as a score of 0.9 where the scores are generated in a scale from 0 to 1. The first prediction receives a lower score of 0.3 for having less than the expected number of digits. The tag manager selects the result in the tag cluster results having the highest score. In this example, the highest score is associated with the second prediction 504. In another example, a prediction result having a score of 0.7 would be considered a lower score than the first prediction with the score of 0.9 and higher than the second prediction with the score of 0.3. In this manner, the system identifies the best (highest quality) result based on the score.

Figure 6:
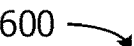
FIG. 6 is an exemplary flow chart illustrating operation of the computing device to perform object tracking and cluster voting for pallet tag detections and tag missing exceptions.

FIG. 6 is an exemplary flow chart illustrating operation of the computing device to perform object tracking and cluster voting for pallet tag detections and tag missing exceptions. The process 600 shown in FIG. 6 is performed by a tag manager component, executing on a computing device, such as the computing device 102 or the user device 116 in FIG. 1.

The process begins by obtaining pallet and tag detection results at 602. The pallet and tag results are pallet object detection and pallet tag object detection results generated by one or more trained object detection models, such as, but not limited to, the objection detection model(s) 150 in FIG. 1. The tag manager tracks a selected pallet within an image sequence at 604. The image sequence is a sequence of images generated by an image capture device, such as, but not limited to, the image capture device(s) 204 in FIG. 2. The tag manager determines whether a tag is present in any of the images at 606. If yes, the images including the tags are aggregated into a tag cluster, such as, but not limited to, the tag cluster 330 in FIG. 3. The tag manager calculates a cluster voting score at 608. The cluster voting score is a score associated with text recognition results generated by OCR based on each image in the image cluster. The tag manager selects the result with the highest score at 610. The highest score indicates the text recognition results are likely to be the best due to a higher perceived quality of the image/image data used to generate the result. The tag manager obtains the tag ID number at 612. The ID number is obtained from the highest scoring text recognition result generated based on one of the images in the tag cluster of images. The tag ID number includes a pallet ID and/or an item ID. The process terminates thereafter.

Returning to 606, if a tag is not present in any of the images (tag absent), the tag manager assigns a tag missing confidence score to the tag missing determination at 614. The tag manager triggers a pallet tag missing exception at 616. The tag manager prioritizes handling of pallet tag missing exceptions based on the tag missing scores at 618. The process terminates thereafter.

Figure 7:
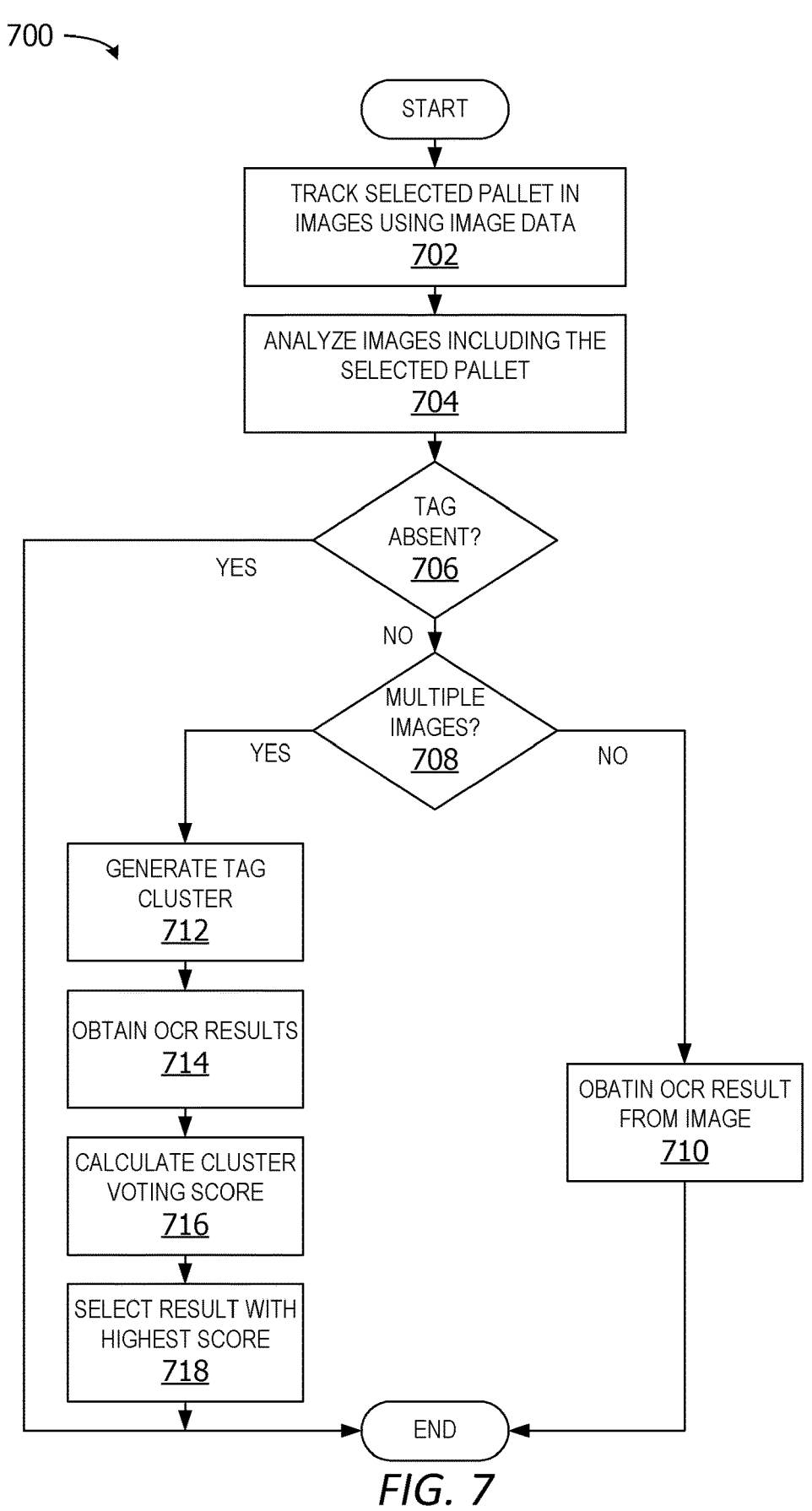
FIG. 7 is an exemplary flow chart illustrating operation of the computing device to perform cluster voting to identify a highest quality OCR result for pallet ID prediction.

While the operations illustrated in FIG. 7 are performed by a computing device, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 7.

Turning now to FIG. 7, an exemplary flow chart illustrating operation of the computing device to perform cluster voting to identify a highest quality OCR result for pallet ID prediction is shown. The process 700 shown in FIG. 7 is performed by a tag manager component, executing on a computing device, such as the computing device 102 or the user device 116 in FIG. 1.

The process begins by tracking a selected pallet in a set of sequential images using image data at 702. The image data is data including bounding boxes and/or annotations identifying pallets and/or pallet tags, such as, but not limited to, the image data 136 in FIG. 1. The image data is generated by detection models trained to detect pallets and pallet tags, such as, but not limited to, the detection model(s) 150 in FIG. 1. The tag manager analyzes the images including a portion of the selected pallet at 704. The tag manager determines if a tag is absent from all the images at 706. If not, the tag manager determines if the tag is present in multiple images at 708. If not, the tag manager obtains the OCR text recognition result from the only image that contains the pallet tag at 710. The pallet ID is predicted using the OCR text recognition result. The process terminates thereafter.

Returning to 708, if the tag is present in multiple images, the tag manager generates a tag cluster including image data for all images having the pallet tag on a portion of the selected pallet at 712. The tag manager obtains OCR text recognition results based on each image including the tag at 714. A cluster voting score is generated for the results at 716. The tag manager selects the result with the highest score at 718. The tag manager generated a predicted pallet tag ID number based on the selected OCR text recognition result. The process terminates thereafter.

While the operations illustrated in FIG. 7 are performed by a computing device, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 7.

Figure 8:
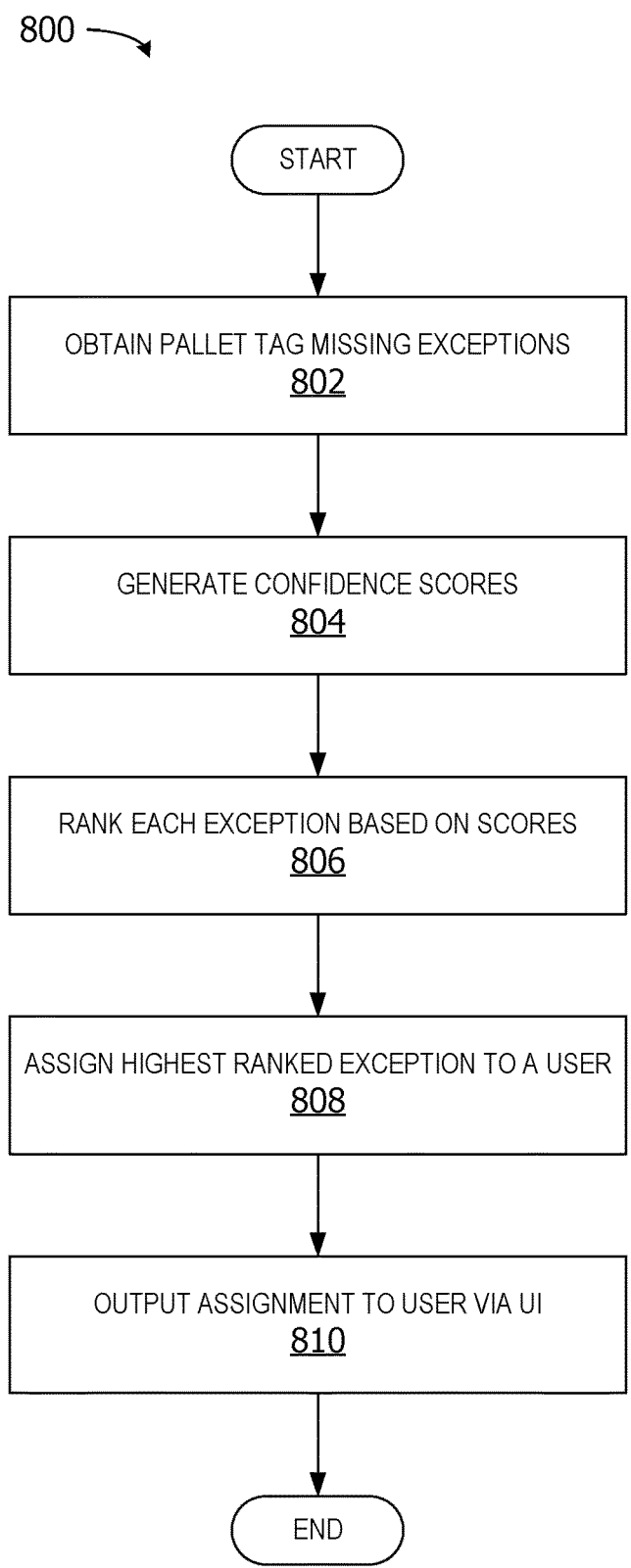
FIG. 8 is an exemplary flow chart illustrating operation of the computing device to prioritize handling of pallet tag missing exceptions based on tag missing confidence scores.

FIG. 8 is an exemplary flow chart illustrating operation of the computing device to prioritize handling of pallet tag missing exceptions based on tag missing confidence scores. The process 800 shown in FIG. 8 is performed by a tag manager component, executing on a computing device, such as the computing device 102 or the user device 116 in FIG. 1.

The process begins by obtaining a plurality of pallet tag missing exceptions at 802. The pallet tag missing exceptions are associated with a plurality of pallets within a retail environment, such as, but not limited to, the pallet(s) 210 in FIG. 2. The tag manager generates tag missing confidence scores at 804. The confidence scores include one or more scores indicating a degree of confidence that the pallet tag missing exceptions are accurate (tag is missing from the pallet), and not a duplicate or erroneous tag missing exception. The scores include one score for each pallet missing a tag. The tag manager ranks each pallet tag missing exception based on the tag missing confidence scores at 806. The tag manager assigns a highest ranked exception to a user for exception ticket handling at 808. The assignment is output to the user via a UI at 810. The UI is a user interface device, such as, but not limited to, the user interface device 110 in FIG. 1 and/or the UI 120 in FIG. 1 and/or FIG. 2. The process terminates thereafter.

While the operations illustrated in FIG. 8 are performed by a computing device, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 8.

ADDITIONAL EXAMPLES

In some embodiments, the tag manager receives a series of images that are taken in sequence by a robotic imaging device moving along the aisles of a store or other retail facility within a retail environment, such as a warehouse, big box store or distribution center. A pallet tag missing exception is generated for each pallet without tags based on computer vision detection results of pallets and tags generated based on the images. A selected pallet is tracked through the images. The images include at least a partial view of the selected pallet. The images are analyzed by the tag manager 140 to determine whether any tags are present in any of the images. However, an image of a pallet typically only includes a partial view of the selected pallet or a view of only one side of the pallet. If a pallet tag is not visible in a given image of a pallet, the tag may be located on another side or portion of the pallet which is not visible in the image of the pallet.

In other embodiments, only a single pallet tag missing exception is sent for each pallet that is missing a tag even though the tag may be missing in multiple images of the pallet. To reduce duplication of pallet tag missing exceptions, a pallet tracking algorithm is used to identify the same pallet across different images based on camera movement direction and detection coordinate similarity between consecutive images. If the pallet tag manager determines the pallet tag is missing, the tag manager 140 triggers only a single missing tag exception and calculates a confidence score which is used to rank or prioritize each missing tag exception. Failure to accurately identify a missing pallet tag for a pallet and/or avoid sending multiple exceptions for the same pallet results in duplication and inaccuracy of pallet tag data.

The system recognizes and tracks a selected pallet in a plurality of images. The tag manager uses tag image cluster voting for higher accuracy text recognition where the tag is detected in multiple images. The system aggregates tag recognition results generated from multiple images of the selected pallet. (images are cropped to include only the selected pallet). Tracking results ID all images having at least a partial view of the selected pallet.

Tag recognition results for the same pallet are aggregated from different images, in some examples. The system obtains bounding box coordinates of pallets and tags in each image and aggregates pallet bounding box coordinates for the selected pallet in each image. A pallet tag missing exception is generated if a pallet does not have a large bounding box coordinates overlap with any tag in all images where it is detected.

In some embodiments, tag detections for the same tag are aggregated as a tag cluster. A tag cluster voting algorithm is used to identify the tag image in the cluster with the best optical character recognition (OCR) using voting to rank the quality of OCR for each tag image in the tag cluster. Cluster voting is used to select the best OCR results for each tag detection in the tag cluster. The tag manager assigns a confidence score to each result.

In other embodiments, each pallet tag missing exception is assigned a confidence level as "high" or "low" based on aggregated information from pallet tracking results. High confidence exception has higher accuracy that the pallet really misses a tag but much less count. The tag missing exceptions are handled in accordance with assigned priority. Users that are handling the exceptions can prioritize checking on pallets having missing pallet tags with a high confidence. Pallets associated with lower confidence pallet tag missing exceptions are given lower priority for correction. This reduces the number of false positives.

In some examples, the system includes a tag manager for identification of pallet tags and detection of missing pallet tags using cluster voting. The system includes an automated image capture device generating a plurality of images of a pallet. The plurality of images includes a first image of a first portion of the pallet and a second image comprising a second portion of the pallet. The tag manager analyzes the plurality of images by a trained item recognition model for pallet tags associated with the pallet. The tag manager triggers a pallet tag missing exception responsive to a failure to detect a pallet tag in any image in the plurality of images. The tag manager generates a tag cluster of images having a portion of a pallet tag associated with the pallet responsive to a detection of at least a portion of the pallet tag in at least one image in the plurality of images. The tag manager assigns a score to each image in the tag cluster. the score indicating a confidence level associated with a pallet identification number of the pallet tag. The tag manager identifies the pallet identification number using the tag cluster of images and the score for each image in the tag cluster. The pallet identification number is associated with the pallet in the plurality of images.

As pallet tracking results provide multiple views of the same pallet from multiple aisle images, tag recognition results on the same pallet are aggregated from multiple images for improving the tag cluster voting for tag OCR accuracy. The same tag can be identified in different images for tag detections with similar relative bounding box coordinates on the same pallet. The OCR results for each tag detection in a tag cluster can be different because of the camera perspective and the image quality, and a best OCR result can be voted by count and confidence to correct and unify other OCR results inside the tag cluster. This tag cluster voting algorithm reduces a large number of pallet ID false positives from raw tag OCR results. Thus, the tag manager uses pallet tracking to identify the same pallets across different payload images. The system finds pallets without pallet tags in any image containing the same pallet. The tag OCR cluster voting logic is used to accurately determine the complete tag ID number on the pallet tag using partial pallet tag numbers from multiple pallet tag images in the plurality of images.

The tag manager, in other embodiments, identifies the same pallet across different images and aggregates a tag cluster for the tag detections for the same tag. The tag manager identifies the tag image in the cluster with a best OCR using voting to rank the quality of OCR for each tag image in the tag cluster. The image with the highest rank based on the vote is used to determine the tag number of the pallet. Each tag missing exception is assigned a confidence level. The tag manager generates the pallet tag missing exception. The pallet tag missing exception is provided to a user via a user interface device with the confidence level.

The system provides high accuracy detection of missing tags differentiating exceptions with high and low confidence rankings for prioritization of exception handling by users. The tag manager includes light weighted tracking logic to identify the same pallet from different images under different lighting conditions and gray scale images. Cluster voting logic is used to merge same pallet tag OCR Text Results from different images for improving OCR accuracy while reducing duplication of pallet tag missing exceptions.

In other embodiments, where the images are captured in an environment with sub-optimal lighting, the images may be too dark for the object detection model(s), OCR algorithm and/or tag manager. In such cases, the tag manager modifies the image data to increase brightness inside bounding box enabling the model(s), OCR and/or a user to read the pallet tag text.

In an example scenario, the system obtains bounding box coordinates of pallets and tags in each image from a CV object detection model. The system identifies and tracks the same pallet across multiple different images using a tracking algorithm based on camera movement, direction, and detection of similar coordinates between consecutive images. The system collects bounding box coordinates for the pallet in all images where the pallet appears based on the tracking results. A pallet tag missing exception is generated if the pallet does not have a large bounding box coordinates overlapping with any tag in any images where it is detected. The pallet tag missing exception for the pallet is assigned a high or low confidence score based on aggregated information from the pallet tracking results. A high confidence exception has higher accuracy that the pallet really is missing its tag. The tag missing confidence scores are used to focus and prioritize pallet tag missing exceptions which should be resolved first based on the higher confidence.

In other embodiments, pallet tag recognition results for multiple images are aggregated together to improve tag OCR accuracy. The same tag can be identified in different images for tag detections with similar relative bounding box coordinates on the same pallet. Tag detections from the same tag are aggregated from different images as a tag cluster. The OCR results for each tag detection in a tag cluster can be different due to different camera angles, camera perspective, lighting conditions, obstructions within the field of view of the camera when an image is taken, other objects blocking different views of the pallet, and overall image quality. A best OCR result is voted by count (number of results with the same score and/or same pallet ID number sequence recognized) and confidence to correct and unify other OCR results inside the tag cluster. This tag cluster voting algorithm reduces a large number of pallet ID false positives from raw tag OCR results.

In other embodiments, the system includes a trained deep learning model that analyzes a plurality of items of a pallet to determine whether a pallet tag is present on the pallet. If the tag is recognized in one or more images, voting is used to identify the correct pallet tag identification number more accurately on the pallet tag. The voting is used to determine which OCR result identifying a partial or complete pallet tag number is most accurate/reliable. The model is trained using labeled training data.

To ensure accuracy and reduce duplication of the pallet tag missing exception, a pallet tracking algorithm is used to identify the same pallet across different aisle images. CV detection and recognition results from different images can be aggregated for each pallet and its tags in the aisle and then a comprehensive and informative view for each pallet is obtained.

Alternatively, or in addition to the other examples described herein, examples include any combination of the following:

responsive to identifying the pallet tag in an image in the set of images, generate the pallet tag text recognition result based on optical character recognition (OCR) on the image, wherein the pallet tag text recognition result comprises at least a portion of a pallet ID number;

responsive to identifying the pallet tag in a set of two images from the set of images that includes a portion of the pallet tag, generate a first pallet tag text recognition result based on a first image from the set of two images that includes the pallet tag and a second pallet tag text recognition result based on a second image from the set of two images;

generate a first confidence score associated with the first pallet tag text recognition result and a second confidence score associated with the second pallet tag text recognition result;

identify a pallet ID of the selected pallet based on the first pallet tag text recognition result associated with a highest confidence score, wherein the second pallet tag text recognition result associated with a lowest confidence score is disregarded;

responsive to identifying the pallet tag in a cluster of images from the set of images, generate a cluster of pallet tag text recognition results corresponding to the cluster of images;

calculate a combined confidence score for each repeated instance of a pallet ID identified in the cluster of pallet tag text recognition results, the combined confidence score comprising an identical pallet ID count times a confidence score;

select a pallet ID associated with a highest combined confidence score;

obtain a plurality of pallet tag missing exceptions associated with the plurality of pallets;

generate a plurality of confidence scores associated with the plurality of pallet tag missing exceptions;

rank each pallet tag missing exception based on the plurality of confidence scores, wherein the plurality of pallet tag missing exceptions is resolved in accordance with the rank for each pallet tag missing exception;

detect the plurality of pallets and pallet tags by a trained object detection model based on the plurality of images;

enclose the selected pallet within a large bounding box in each image in the set of images by the trained object detection model;

enclose each pallet tag associated with the selected pallet within a small bounding box in image data associated with the set of images, wherein the image data is used for tracking the selected pallet through the sequence of images;

calculate a confidence score for each pallet tag text recognition result in a plurality of pallet tag text recognition results for the pallet tag;

apply a threshold minimum confidence score to the plurality of pallet tag text recognition results;

filter any pallet tag text recognition results having a score that is less than the threshold minimum confidence score;

obtaining pallet and pallet tag detection results associated with a plurality of pallets within image data associated with a plurality of images generated by an image capture device within a retail facility;

tracking a selected pallet appearing within a set of images within the plurality of images, the set of images comprising images including a portion of the selected pallet;

determining whether a pallet tag associated with the selected pallet is present within any image in the set of images using a set of coordinates associated with the pallet;

responsive to determining the pallet tag is absent from the set of images, generating a tag missing confidence score indicating a degree of confidence the pallet tag associated with the selected pallet is absent based on quality of image data associated with the set of images;

triggering a pallet tag missing exception associated with the selected pallet, the pallet tag missing exception including the tag missing confidence score, wherein the pallet tag missing exception is prioritized based on the tag missing confidence score;

calculating a cluster voting score for each pallet tag text recognition result in a set of text recognition results associated with a set of pallet tag detections for the selected pallet in response to presence of the pallet tag within the set of images, wherein a pallet tag text recognition result having a highest score is used to identify an accurate tag identification (ID) number on the pallet tag;

responsive to identifying the pallet tag in a set of two images from the set of images that includes a portion of the pallet tag, generating a first pallet tag text recognition result based on a first image from the set of two images that includes the pallet tag and a second pallet tag text recognition result based on a second image from the set of two images;

generating a first confidence score associated with the first pallet tag text recognition result and a second confidence score associated with the second pallet tag text recognition result;

identifying a pallet ID of the selected pallet based on the first pallet tag text recognition result associated with a highest confidence score, wherein the second pallet tag text recognition result associated with a lowest confidence score is disregarded;

assigning a first rank to a first pallet tag missing exception based on a first tag missing confidence score;

assigning a second rank to a second pallet tag missing exception based on a second tag missing, wherein the first rank is a higher priority rank than the second rank;

assigning a user to resolve the first pallet tag missing exception prior to resolving the second pallet tag missing exception;

selecting a pallet tag ID from a predicted pallet tag IDs associated with the selected pallet based on a confidence score associated with each predicted pallet tag ID, wherein the confidence score indicates a quality of optical character recognition results associated with each image containing a portion of the pallet tag ID;

determining whether the set of coordinates associated with the selected pallet overlaps with a pallet tag in any image in the set of images;

triggering the pallet tag missing exception responsive to determining the bounding box coordinates fail to overlap with any portion of the pallet tag in any image in the set of images;

generating a plurality of confidence scores associated with a plurality of pallet tag missing exceptions;

prioritizing handling of the plurality of pallet tag missing exceptions based on the plurality of confidence scores;

obtain pallet and pallet tag detection results associated with a plurality of pallets within a plurality of images generated by an image capture device within a retail facility;

track a selected pallet appearing within a set of images within the plurality of images, the set of images comprising a sequence of images including a portion of the selected pallet;

analyze the set of images to determine whether a pallet tag associated with the selected pallet is present within any image in the set of images;

responsive to a determination a portion of the pallet tag is present in a sub-set of the images in the set of images, generate a cluster of images comprising the sub-set of images;

generate a set of pallet tag text recognition results based on text recognized in the portion of the pallet tag present in the cluster of images;

calculate a cluster voting score for each pallet tag text recognition result in a set of text recognition results associated with a set of pallet tag detections for the selected pallet in response to the determination the pallet tag is present within the set of images, wherein a pallet tag text recognition result having a highest score is used to identify an accurate tag identification (ID) number on the pallet tag;

if the pallet tag is absent from all images of the selected pallet, assign a tag missing confidence score indicating a degree of confidence the pallet tag is missing and generate a pallet tag missing exception;

assign the missing tag confidence score to the pallet tag missing exception;

determine whether bounding box coordinates associated with the selected pallet overlaps with pallet tag coordinates in the set of images;

responsive to failure of the bounding box coordinates to overlap with the pallet tag coordinates, identify the pallet tag as missing from the set of images;

responsive to identifying the pallet tag in a set of two images from the set of images that includes a portion of the pallet tag, generating a first pallet tag text recognition result based on a first image from the set of two images that includes the pallet tag and a second pallet tag text recognition result based on a second image from the set of two images;

generating a first confidence score associated with the first pallet tag text recognition result and a second confidence score associated with the second pallet tag text recognition result;

identifying a pallet ID of the selected pallet based on the first pallet tag text recognition result associated with a highest confidence score, wherein the second pallet tag text recognition result associated with a lowest confidence score is disregarded;

calculate a combined confidence score for each repeated instance of a pallet ID identified in the cluster of pallet tag text recognition results, the combined confidence score comprising an identical pallet ID count times a confidence score;

selecting a pallet ID associated with a highest combined confidence score;

apply a threshold minimum confidence score to a plurality of pallet tag text recognition results; and filter any pallet tag text recognition results having a score that is less than the threshold minimum confidence score.

At least a portion of the functionality of the various elements in FIG. 1, FIG. 2, FIG. 3, and FIG. 5 can be performed by other elements in FIG. 1, FIG. 2, FIG. 3 and FIG. 5, or an entity (e.g., processor 106, web service, server, application program, computing device, etc.) not shown in FIG. 1, FIG. 2, FIG. 3, and FIG. 5.

In some examples, the operations illustrated in FIG. 6, FIG. 7, and FIG. 8 can be implemented as software instructions encoded on a computer-readable medium, in hardware programmed or designed to perform the operations, or both. For example, aspects of the disclosure can be implemented as a system on a chip or other circuitry including a plurality of interconnected, electrically conductive elements.

In other examples, a computer readable medium having instructions recorded thereon which when executed by a computer device cause the computer device to cooperate in performing a method of object tracking and cluster voting for pallet tag management, the method comprising obtaining pallet and pallet tag detection results associated with a plurality of pallets within image data associated with a plurality of images generated by an image capture device within a retail facility; tracking a selected pallet appearing within a set of images within the plurality of images, the set of images comprising images including a portion of the selected pallet; determining whether a pallet tag associated with the selected pallet is present within any image in the set of images using a set of coordinates associated with the pallet; responsive to determining the pallet tag is absent from the set of images, generating a tag missing confidence score indicating a degree of confidence the pallet tag associated with the selected pallet is absent based on quality of image data associated with the set of images; and triggering a pallet tag missing exception associated with the selected pallet, the pallet tag missing exception including the tag missing confidence score, wherein the pallet tag missing exception is prioritized based on the tag missing confidence score. The prioritization is particularly useful in situations where the system may be handling hundreds of pallet tag missing exceptions in retail facilities that are managing thousands of pallets.

While the aspects of the disclosure have been described in terms of various examples with their associated operations, a person skilled in the art would appreciate that a combination of operations from any number of different examples is also within scope of the aspects of the disclosure.

A tethered connection can occur over a wired connection or a wireless connection. The term "Wi-Fi" as used herein refers, in some examples, to a wireless local area network using high frequency radio signals for the transmission of data. The term "BLUETOOTH®" as used herein refers, in some examples, to a wireless technology standard for exchanging data over short distances using short wavelength radio transmission. The term "NFC" as used herein refers, in some examples, to a short-range high frequency wireless communication technology for the exchange of data over short distances.

Exemplary Operating Environment

Exemplary computer-readable media include flash memory drives, digital versatile discs (DVDs), compact discs (CDs), floppy disks, and tape cassettes. By way of example and not limitation, computer-readable media comprise computer storage media and communication media. Computer storage media include volatile and nonvolatile, removable, and non-removable media implemented in any method or technology for storage of information such as computer-readable instructions, data structures, program modules and the like. Computer storage media are tangible and mutually exclusive to communication media. Computer storage media are implemented in hardware and exclude carrier waves and propagated signals. Computer storage media for purposes of this disclosure are not signals per se.

Exemplary computer storage media include hard disks, flash drives, and other solid-state memory. In contrast, communication media typically embody computer-readable instructions, data structures, program modules, or the like, in a modulated data signal such as a carrier wave or other transport mechanism and include any information delivery media.

Although described in connection with an exemplary computing system environment, examples of the disclosure are capable of implementation with numerous other special purpose computing system environments, configurations, or devices.

Examples of well-known computing systems, environments, and/or configurations that can be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. Such systems or devices can accept input from the user in any way, including from input devices such as a keyboard or pointing device, via gesture input, proximity input (such as by hovering), and/or via voice input.

Examples of the disclosure can be described in the general context of computer-executable instructions, such as program modules, executed by one or more computers or other devices in software, firmware, hardware, or a combination thereof. The computer-executable instructions can be organized into one or more computer-executable components or modules. Generally, program modules include, but are not limited to, routines, programs, objects, components, and data structures that perform tasks or implement abstract data types. Aspects of the disclosure can be implemented with any number and organization of such components or modules. For example, aspects of the disclosure are not limited to the specific computer-executable instructions, or the specific components or modules illustrated in the figures and described herein. Other examples of the disclosure can include different computer-executable instructions or components having more functionality or less functionality than illustrated and described herein.

In examples involving a general-purpose computer, aspects of the disclosure transform the general-purpose computer into a special-purpose computing device when configured to execute the instructions described herein.

The examples illustrated and described herein as well as examples not specifically described herein but within the scope of aspects of the disclosure constitute exemplary means for managing pallets and pallet tag data. For example, the elements illustrated in FIG. 1, FIG. 2, FIG. 3 and FIG. 5, such as when encoded to perform the operations illustrated in FIG. 6, FIG. 7, and FIG. 8, constitute exemplary means for tracking a selected pallet appearing within a set of images within the plurality of images, the set of images comprising a sequence of images including a portion of the selected pallet; exemplary means for analyzing the set of images to determine whether a pallet tag associated with the selected pallet is present within any image in the set of images; exemplary means for assigning a confidence score indicating a degree of confidence the pallet tag associated with the selected pallet is absent, wherein a pallet tag missing exception is generated in response to the determination the pallet tag is absent, wherein handling the pallet tag missing exception is prioritized based on the confidence score; and exemplary means for calculating a cluster voting score for each pallet tag text recognition result in a set of text recognition results associated with a set of pallet tag detections for the selected pallet in response to the determination the pallet tag is present within the set of images, wherein a pallet tag text recognition result having a highest score is used to identify an accurate tag identification (ID) number on the pallet tag.

Other non-limiting examples provide one or more computer storage devices having a first computer-executable instructions stored thereon for providing object tracking and cluster voting for pallet tag management. When executed by a computer, the computer performs operations including tracking a selected pallet appearing within a set of images within the plurality of images, the set of images comprising a sequence of images including a portion of the selected pallet; analyzing the set of images to determine whether a pallet tag associated with the selected pallet is present within any image in the set of images; generating a cluster of images including images of the pallet tag or portion of the pallet tag; generating a set of pallet tag text recognition results based on text recognized in the portion of the pallet tag present in the cluster of images; and calculating a cluster voting score for each pallet tag text recognition result in a set of text recognition results associated with a set of pallet tag detections for the selected pallet in response to the determination the pallet tag is present within the set of images, wherein a pallet tag text recognition result having a highest score is used to identify an accurate tag identification (ID) number on the pallet tag.

The order of execution or performance of the operations in examples of the disclosure illustrated and described herein is not essential, unless otherwise specified. That is, the operations can be performed in any order, unless otherwise specified, and examples of the disclosure can include additional or fewer operations than those disclosed herein. For example, it is contemplated that executing or performing an operation before, contemporaneously with, or after another operation is within the scope of aspects of the disclosure.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e., "one or the other but not both") when preceded by terms of exclusivity, such as "either" "one of" "only one of" or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for pallet tag tracking and cluster voting, the system comprising:
    a processor; and
        a computer-readable medium storing instructions that are operative upon execution by the processor to:
        obtain pallet and pallet tag detection results associated with a plurality of pallets within a plurality of images generated by an image capture device within a retail environment;

track a selected pallet appearing within a set of images within the plurality of images, the set of images comprising a sequence of images including a portion of the selected pallet;
    analyze the set of images to determine whether a pallet tag associated with the selected pallet is present within any image in the set of images;
    assign a confidence score indicating a degree of confidence the pallet tag associated with the selected pallet is absent, wherein a pallet tag missing exception is generated in response to the determination the pallet tag is absent, wherein handling the pallet tag missing exception is prioritized based on the confidence score; and
    calculate a cluster voting score for each pallet tag text recognition result in a set of text recognition results associated with a set of pallet tag detections for the selected pallet in response to the determination the pallet tag is present within the set of images, wherein a pallet tag text recognition result having a highest score is used to identify an accurate tag identification (ID) number on the pallet tag.

2. The system of claim 1, wherein the instructions are further operative to:
    responsive to identifying the pallet tag in an image in the set of images, generate the pallet tag text recognition result based on optical character recognition (OCR) on the image, wherein the pallet tag text recognition result comprises at least a portion of a pallet ID number.

3. The system of claim 1, wherein the instructions are further operative to:
    responsive to identifying the pallet tag in a set of two images from the set of images that includes a portion of the pallet tag, generate a first pallet tag text recognition result based on a first image from the set of two images that includes the pallet tag and a second pallet tag text recognition result based on a second image from the set of two images;
    generate a first confidence score associated with the first pallet tag text recognition result and a second confidence score associated with the second pallet tag text recognition result; and
    identify a pallet ID of the selected pallet based on the first pallet tag text recognition result associated with a highest confidence score, wherein the second pallet tag text recognition result associated with a lowest confidence score is disregarded.

4. The system of claim 1, wherein the instructions are further operative to:
    responsive to identifying the pallet tag in a cluster of images from the set of images, generate a cluster of pallet tag text recognition results corresponding to the cluster of images;
    calculate a combined confidence score for each repeated instance of a pallet ID identified in the cluster of pallet tag text recognition results, the combined confidence score comprising an identical pallet ID count times a confidence score; and
    select a pallet ID associated with a highest combined confidence score.

5. The system of claim 1, wherein the instructions are further operative to:
    obtain a plurality of pallet tag missing exceptions associated with the plurality of pallets;
    generate a plurality of confidence scores associated with the plurality of pallet tag missing exceptions; and rank each pallet tag missing exception based on the plurality of confidence scores, wherein the plurality of pallet tag missing exceptions is resolved in accordance with the rank for each pallet tag missing exception.

6. The system of claim 1, wherein the instructions are further operative to:

detect the plurality of pallets and pallet tags by a trained object detection model based on the plurality of images;

enclose the selected pallet within a large bounding box in each image in the set of images by the trained object detection model; and enclose each pallet tag associated with the selected pallet within a small bounding box in image data associated with the set of images, wherein the image data is used for tracking the selected pallet through the sequence of images.

7. The system of claim 1, wherein the instructions are further operative to:

calculate a confidence score for each pallet tag text recognition result in a plurality of pallet tag text recognition results for the pallet tag;

apply a threshold minimum confidence score to the plurality of pallet tag text recognition results; and filter any pallet tag text recognition results having a score that is less than the threshold minimum confidence score.

8. A method for pallet tracking and cluster voting, the method comprising:

obtaining pallet and pallet tag detection results associated with a plurality of pallets within image data associated with a plurality of images generated by an image capture device within a retail facility;

tracking a selected pallet appearing within a set of images within the plurality of images, the set of images comprising images including a portion of the selected pallet;

determining whether a pallet tag associated with the selected pallet is present within any image in the set of images using a set of coordinates associated with the pallet;

responsive to determining the pallet tag is absent from the set of images, generating a tag missing confidence score indicating a degree of confidence the pallet tag associated with the selected pallet is absent based on quality of image data associated with the set of images; and triggering a pallet tag missing exception associated with the selected pallet, the pallet tag missing exception including the tag missing confidence score, wherein the pallet tag missing exception is prioritized based on the tag missing confidence score.

9. The method of claim 8, further comprising:

calculating a cluster voting score for each pallet tag text recognition result in a set of text recognition results associated with a set of pallet tag detections for the selected pallet in response to presence of the pallet tag within the set of images, wherein a pallet tag text recognition result having a highest score is used to identify an accurate tag identification (ID) number on the pallet tag.

10. The method of claim 8, further comprising:

responsive to identifying the pallet tag in a set of two images from the set of images that includes a portion of the pallet tag, generating a first pallet tag text recognition result based on a first image from the set of two images that includes the pallet tag and a second pallet tag text recognition result based on a second image from the set of two images;

generating a first confidence score associated with the first pallet tag text recognition result and a second confidence score associated with the second pallet tag text recognition result; and identifying a pallet ID of the selected pallet based on the first pallet tag text recognition result associated with a highest confidence score, wherein the second pallet tag text recognition result associated with a lowest confidence score is disregarded.

11. The method of claim 8, further comprising:

assigning a first rank to a first pallet tag missing exception based on a first tag missing confidence score;

assigning a second rank to a second pallet tag missing exception based on a second tag missing, wherein the first rank is a higher priority rank than the second rank; and assigning a user to resolve the first pallet tag missing exception prior to resolving the second pallet tag missing exception.

12. The method of claim 8, further comprising:

selecting a pallet tag ID from a predicted pallet tag IDs associated with the selected pallet based on a confidence score associated with each predicted pallet tag ID, wherein the confidence score indicates a quality of optical character recognition results associated with each image containing a portion of the pallet tag ID.

13. The method of claim 8, further comprising:

determining whether the set of coordinates associated with the selected pallet overlaps with a pallet tag in any image in the set of images; and triggering the pallet tag missing exception responsive to determining bounding box coordinates fail to overlap with any portion of the pallet tag in any image in the set of images.

14. The method of claim 8, further comprising:

generating a plurality of confidence scores associated with a plurality of pallet tag missing exceptions; and prioritizing handling of the plurality of pallet tag missing exceptions based on the plurality of confidence scores.

15. One or more computer storage devices having computer-executable instructions stored thereon, which, upon execution by a computer, cause the computer to perform operations comprising:

obtain pallet and pallet tag detection results associated with a plurality of pallets within a plurality of images generated by an image capture device within a retail facility;

track a selected pallet appearing within a set of images within the plurality of images, the set of images comprising a sequence of images including a portion of the selected pallet;

analyze the set of images to determine whether a pallet tag associated with the selected pallet is present within any image in the set of images;

responsive to a determination a portion of the pallet tag is present in a sub-set of the images in the set of images, generate a cluster of images comprising the sub-set of images;

generate a set of pallet tag text recognition results based on text recognized in the portion of the pallet tag present in the cluster of images; and calculate a cluster voting score for each pallet tag text recognition result in a set of text recognition results associated with a set of pallet tag detections for the selected pallet in response to the determination the pallet tag is present within the set of images, wherein a pallet tag text recognition result having a highest score is used to identify an accurate tag identification (ID) number on the pallet tag.

16. The one or more computer storage devices of claim 15, wherein the operations further comprise:

responsive to determining the pallet tag is absent from all images in the set of images, calculate a tag missing confidence score indicating a degree of confidence the pallet tag is missing;

generate a pallet tag missing exception; and assign the missing tag confidence score to the pallet tag missing exception.

17. The one or more computer storage devices of claim 15, wherein the operations further comprise:

determine whether bounding box coordinates associated with the selected pallet overlaps with pallet tag coordinates in the set of images; and responsive to failure of the bounding box coordinates to overlap with the pallet tag coordinates, identify the pallet tag as missing from the set of images.

18. The one or more computer storage devices of claim 15, wherein the operations further comprise:

responsive to identifying the pallet tag in a set of two images from the set of images that includes a portion of the pallet tag, generating a first pallet tag text recognition result based on a first image from the set of two images that includes the pallet tag and a second pallet tag text recognition result based on a second image from the set of two images;

generating a first confidence score associated with the first pallet tag text recognition result and a second confidence score associated with the second pallet tag text recognition result; and identifying a pallet ID of the selected pallet based on the first pallet tag text recognition result associated with a highest confidence score, wherein the second pallet tag text recognition result associated with a lowest confidence score is disregarded.

19. The one or more computer storage devices of claim 15, wherein the operations further comprise:

calculate a combined confidence score for each repeated instance of a pallet ID identified in the cluster of pallet tag text recognition results, the combined confidence score comprising an identical pallet ID count times a confidence score; and selecting a pallet ID associated with a highest combined confidence score.

20. The one or more computer storage devices of claim 15, wherein the operations further comprise:

apply a threshold minimum confidence score to a plurality of pallet tag text recognition results; and filter any pallet tag text recognition results having a score that is less than the threshold minimum confidence score.

* * * * *